United States Patent [19]

Giroux

[11] Patent Number: 4,930,844
[45] Date of Patent: Jun. 5, 1990

[54] WHEEL

[76] Inventor: Edward J. Giroux, P.O. Box 247, Milford, Mich. 48042

[21] Appl. No.: 258,491

[22] Filed: Oct. 17, 1988

[51] Int. Cl.$^5$ .............................................. B60B 27/02
[52] U.S. Cl. ............................... 301/63 PW; 301/104; 301/105 B
[58] Field of Search ........... 301/54, 62, 63 PW, 64 R, 301/67, 74, 95–98, 104, 105 B

[56] References Cited

U.S. PATENT DOCUMENTS

| | | | |
|---|---|---|---|
| 4,252,378 | 2/1981 | DeBolt et al. | 301/63 PW X |
| 4,793,659 | 12/1988 | Oleff et al. | 301/54 X |
| 4,810,040 | 3/1989 | Chi | 301/105 B |

FOREIGN PATENT DOCUMENTS

| | | | |
|---|---|---|---|
| 0073408 | 3/1983 | European Pat. Off. | 301/63 PW |
| 0074701 | 4/1987 | Japan | 301/104 |

OTHER PUBLICATIONS

P. 10, *Triathlete*, Jun. 1988.

*Primary Examiner*—Russell D. Stormer
*Attorney, Agent, or Firm*—Miller, Morriss & Pappas

[57] ABSTRACT

A wheel of the bicycle type that is injection molded with a formulation of polyamide resin and fiber in which hub, spokes and rim are integral and where the precision injection molded wheel substantially eliminates machining. The spokes are aerodynamic vanes in form. A new and improved bearing support structure convertable from front to back wheel usage is applied to the hub and axle.

4 Claims, 2 Drawing Sheets

WHEEL

The present invention relates to a wheel and particularly to a bicycle type wheel which is injection molded at high precision and in which an injection molded formulation of dimensionally stable resin and fiber filler, when cured, provides a shock resistant and integrally formed wheel prepared to receive axle and hub inserts and a tire and in which structure the integral spokes are aerodynamically formed to lower resistance to cross winds and with consequent stabilization of a vehicle using the present wheel. The present invention may be cast to a formed metal rim where highly abrasive or other unusual stress conditions are contemplated at the rim.

Competitive cycling and endurance sports on bicycles have required increased innovation in bicycles and bicycle accessories. In general light weight is sought in all parts and aluminum and magnesium metals have replaced steel in bicycle frames, handle bars and the like. However, relatively conventional wheels have been continued in part because of wheel size standardization and in part to provide the rigidity and balance sought by adjustably tensioned spokes which support the hub of the wheel between hub and rim. Realistically the weight of rider, frame, accessories and other bicycle loading is concentrated on bearings at the wheel axles, and the spokes, then, trasmits the load, to the rims, through the tires and the load is dynamically relieved to the riding surface.

The first appearance of plastics or resins in wheels for cycles and the like is believed to have occurred in molded toys using disc type wheels with subsequent opening of disc or web of the wheel and the transition in that design to bicycles has been relatively unobserved by those who race and contest in bicycles. Recently, in about 1988 June, a press announcement introduced a "Tri-Spoke Wheel" by Schwinn (*Triathlete* 1988 June Pg. 10) and that structure was directed to a hand lay-up of Kevlar and carbon-fiber as developed by Rene Arredondo who compared the wheel to disc wheels but stronger and having improved lighter weight.

While the present invention bears some superficial resemblance to the work of Arredondo it will be seen as separately directed to an injection molded wheel with attendant savings and with a wholly different approach to aerodynamic performance and acceptance.

Accordingly the principal object of the present invention is to provide an injection molded wheel for bicycles and the like with integral parts of rim, hub and spokes with minimal machining and high precision, and with aerodynamic improvement.

Another object is to teach the preparation of such a wheel with attendant reduction in cost from the cost of previously known wheels acceptable in endurance, racing and the like.

Another object is to provide a wheel with superior aerodynamic features in which the spokes play a prominant part in avoidance of air turbulence experienced in metal spoked wheels. Also, the elimination of spoked wheels avoids accomodating of metal spokes through the rims and eliminates pinching and chafing of the tubes and tires.

Other objects and improvements including an improved hub supported axle and bearing housing will be appreciated as the description proceeds.

In the Drawings:

FIG. 8 is a perspective view of the rear wheel bearing support as used in the rear wheel and including the threaded external shoulder for mounting rear wheel drive components as for instance sprockets, gearing and the like.

GENERAL DESCRIPTION

Figure 1:
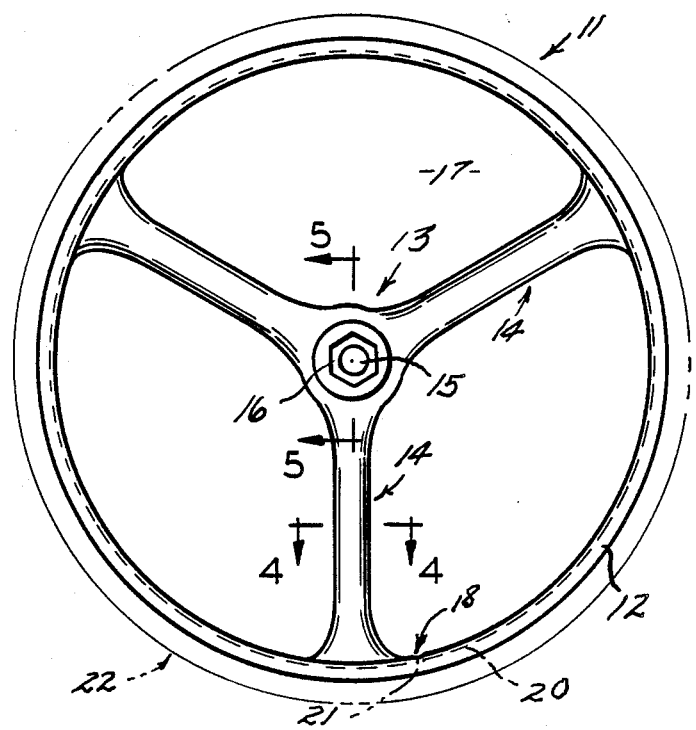
FIG. 1 is a side elevation view of a bicycle wheel in accord with the present invention and indicating in phantom-line the tire position.

In general a precision mold (not shown) is prepared for injection molding of the wheel of the present invention and in which plural spokes, the rim, and the hub, are injection molded in a single shot using an injection moldable compound of nylon resin with fiber filler to a precision sizing and the selected configuration. The resin-fiber material requires little or no machining and in other respects faithfully conforms to the mold configuration. The injection molded part is removed from the mold and is cured to high strength for use. The cross section of the spokes is in the form of a teardrop and runs from the hub to the rim. At the hub and the rim the spokes (usually 3 or 5) blend with the arcuate profile of the rim and the hub in a regular symmetry about a plane passing through the center of the hub, the rim and the spokes and transversely through the axis of the hub.

An opening on the axis through the hub is provided and precision sized and formed as molded. Outboard of the opening in the hub is a recess presenting an out-of-round configuration (as for example, hexagonal) in which nests bearing support mating shoulders on the bearing supports on both sides of the hub so that as the body of the supports are press fitted into the opening the supports are prevented from rotating in the precision and aligned fit.

The bearing support assembly includes a precision machined tubular axle threaded at both ends and having a stepped shoulder at both of the ends of the center body portion of the axle. The stepped shoulders are immediately adjacent the threaded portion of the axle and will be seen to partially support the inner race of sealed anti-friction bearings. Threaded nuts on each end of the axle are mated to the threaded ends of the axle element and on their inner ends both nuts include an extending shoulder or sleeve which also partially supports the inner race of the anti-friction bearings. The nuts include external flats so that they are easily turned and urge the bearings against the buttresses on the shaft or axle. The outer race of the bearings rest in the respective recesses of the cylindrical bearing supports. Between the races are balls or other anti-friction elements against which the races bear. This provides excellent alignment. The sealed cartridge-like replacement bearings provide innovation in ease of assembly and disassembly. The same journal assembly is useable in rear wheels of bicycles, for example, by utilizing a bearing support element for rear wheels on one side only and which is externally threaded on the outboard extension to receive rear wheel drive components as sprockets, shifters, gearing and the like. In other respects the rear wheel bearing support on the one side is internally and externally identical to the front wheel bearing supports. The nuts are provided with perimeter slots into which frame elements are positionable.

The rim portion of the wheel of the present invention provides a tire embracing concave walled groove having a smooth surface with only a single valve opening that passes radially through the wall of the rim in the plane of symmetry of the wheel and in retention of good static wheel balance. While the valve opening may be machined, a preferred construction is to mold the opening using a retractable pin in the dies for the injection molding. Sharp edges can be avoided and at substantial savings to tires or tubes bearing against the rim and rim flanges. Where desired by use conditions the dies may support, for injection molding in-situ, a metal rim liner against which the resin and filler is applied.

The resin compound for injection molding employed for achieving the dimensionally stable material in the wheels of the present invention is Nylon formulated and combined with glass particles. Other fiber additives include graphite fibers. The fibers serve as a reinforcement filler and provide strength and impart resistance, stability and ruggedness in the product. While other resin injection molded materials may be available the preferred materials are Nylon chemically expressed as a long chain synthetic polyamide resin characterised for its molding properties, its inherent toughness over wide thermal ranges with good dimensional stability and abrasion resistance. Other resins having similar characteristics and equal or better properties and useable with glass or graphite fibers may be used.

SPECIFIC DESCRIPTION

Referring to the drawings and with first attention to the FIG. 1 thereof a wheel 11 in accord with the present invention is indicated. The wheel 11 is of the bicycle type and the rim portion 12, the hub portion 13 and intermediate radial connecting spokes 14 (three in number shown) are integrally formed by injection molding using a fiber filled polyamide resin popularly described as a Nylon resin. The hub portion 13 has a cylindrical through-opening 15 which, as will be seen, establishes a receptacle for bearing support elements for journalling a wheel axle therethrough. Around the opening 15 on both sides of the wheel 11 in hub 13 are shouldered out-of-round recesses 16 which, as will be seen, prevent the bearing support elements from turning. As shown, the recesses 16 around the cylindrical opening 15 are preferred as hexagonal. The rim 12 is generally concave on its outward facing perimeter and is radially inwardly tapered on the inner perimeter fairing, however, as the rim 12 blends with the spoke portions 14 which are web-like and are aerodynamically configured. The spokes 14 define, with the hub 13 and rim 12, open spaces 17 which permit wind and air permeation through the wheel 11. A notch 18 in the inner surface 19 of the rim 12 provides a valve access to the outer and concave surface 20 (FIG. 2) of the rim 12. The radial passage 21 through the rim provides an entry for a tire valve (not shown).

Figure 2:
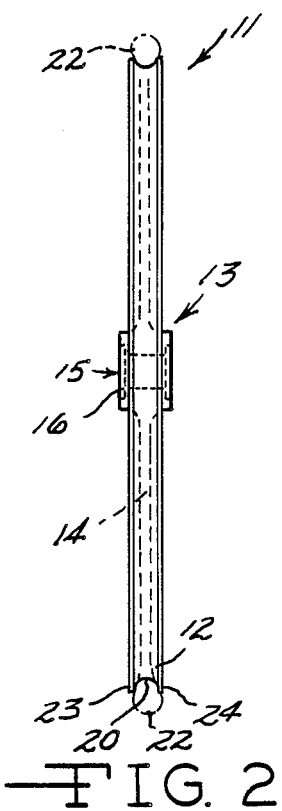
FIG. 2 is a front elevation view of the bicycle wheel shown in FIG. 1 and indicating the integral relationships of rim to hub to spokes.

In the FIG. 2 the wheel 11 is understood as being symmetrical about a plane passed generally through the center of the hub 13 and transverse to the axis thereof. The rim 12 running around the wheel 11 is on the same plane, as are also the plural radially disposed spokes 14. In this view the fairing or blending of the portions of rim 12, spokes 14 and hub 13 is best appreciated and the hub 13 is seen to extend axially outwardly somewhat beyond the width of the rim 12. The tire 22 is shown nesting against the arcuately converging integral flanges 23 and 24 of the rim portion 12. The thickness of the spokes 14 (FIG. 2) is relatively observed in respect to the width of spokes 14 best seen in FIG. 1.

Figure 3:
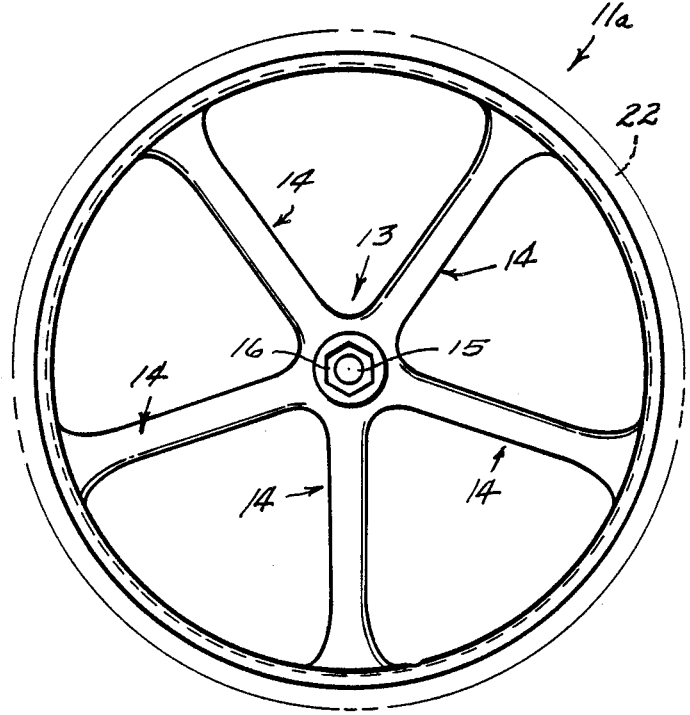
FIG. 3 is a side elevation view of a five spoked bicycle wheel in accord with the present invention.
Figure 4:
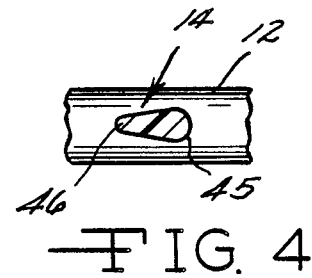
FIG. 4 is a partial section view taken on the line 4—4 of FIG. 1 and indicating the tear-drop configuration of the integral spoke in cross section.

In FIG. 3 a five spoke configuration of a wheel 11a is shown contrasted to the three spoke showing in FIG. 1. The description of hub portion 13, rim portion 12, and spokes 14 as being integrally molded still applies and need not be repeated and the tire 22 is shown in phantom-line secured, as inflated, in the rim portion 12. The openings 17' are defined by different perimeters by virtue of the equiangular disposition and geometry consequent to the use of the five spokes 14. The cross section configuration of the spokes 14 corresponds generally to the tear-drop configuration shown in the FIG. 4. In FIG. 4 the rim 12 is shown with the spoke 14 in cross section as in tear drop form so that the spoke 14 is vane-like and with the vane positioned in the plane of symmetry of the wheel 11, 11a. Immediately observable is a quantum reduction of turbulence experienced when using prior art wire metal spokes.

Figure 5:
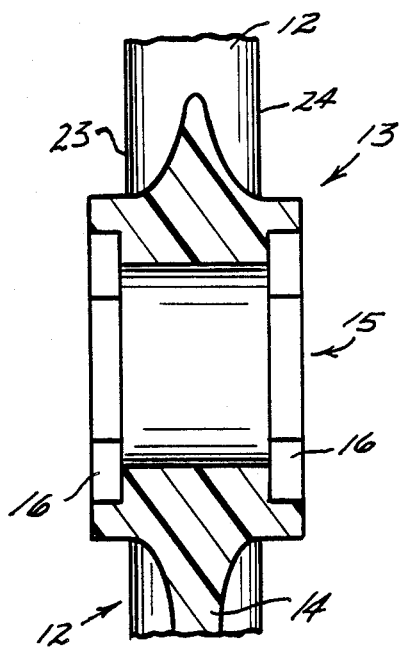
FIG. 5 is a front elevation partial section view through the hub portion of the wheel taken on line 5—5 of FIG. 1 and revealing the precision cast receiving opening for the journalling of the wheel.
Figure 6:
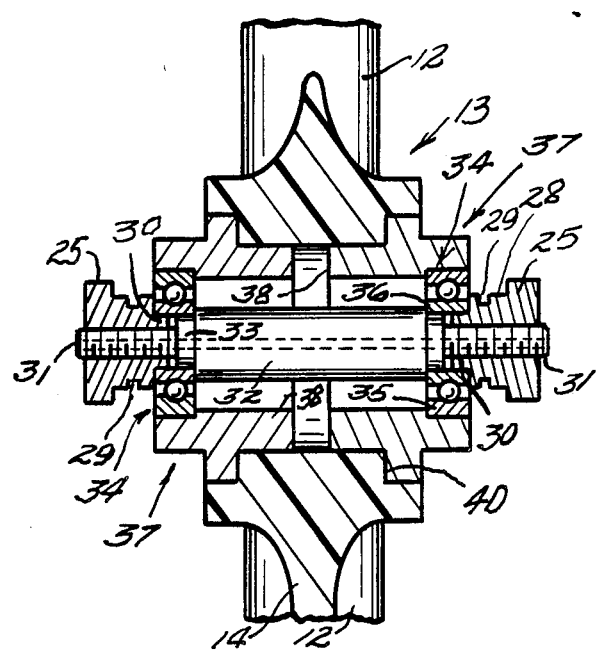
FIG. 6 is a front elevation full section view of the improved journal assembly as used for the front wheel of a bicycle in accord with the present invention.
Figure 7:
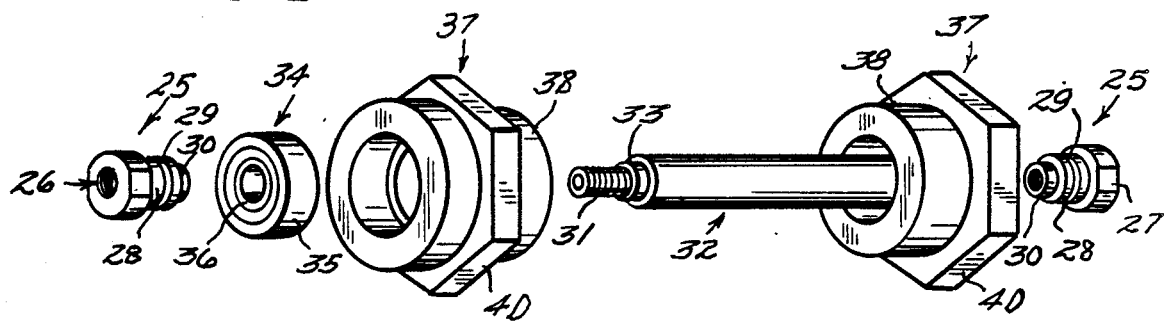
FIG. 7 is an exploded perspective view of the improved journal assembly as shown in the FIG. 6 for the journalling of a front wheel in accord with the present invention.

The FIG. 5 best illuminates the hub 13 and the opening 15 and hexagonal recess 16. The integrity of injection molded hub 13 with spoke 14 is appreciated. The fairing of hub 13 to the spokes 14 is also indicated. The hub 13 is clearly indicated as extending beyond the width extension of the flanges 23 and 24 of the rim 12. FIG. 6 shows the axle support assembly with inserts through the rim 12. The axle support assembly is press fitted into the axial opening 15 of the hub 13. The nuts 25 include an internally threaded axial opening 26. Flats 27 are provided on the head portion of the nuts 25 to facilitate use of a wrench for tightening and removal. The nuts 25 reduce to a shouldered circumference 28 creased by a central circumferential groove 29 and the nuts 25 are further stepped down to the short tubular or sleeve-like extension 30. The nuts 25 engage the threaded ends 31 of the tubular axle 32. The axle 32 includes steps 33 of a diameter corresponding to the outer diameter of the tubular extensions 30 of the nuts 25. A pair of housed or sealed anti-friction bearings 34 (shown as ball bearings) with outer and inner races 35 and 36, respectively, fit over the tubular extension 30 and the cylinder step 33 of axle 32 so that the inner race 36 of the bearings 34 supports the axle 32 and the nuts 25 which form extensions of the axle 32. The outer races 35 of both bearings 34 are press fitted into tubular support elements 37 having inwardly facing tubular extensions 38 which, as will be seen are press fitted into the hub opening 15 and to shouldering and nesting support in the out-of-round recess 16 (hexagonal) of the hub 13. The precision axial opening 15 then accepts the bearing support assembly of FIG. 6 which provides excellent running bearings 34 (balls between races 35 and 36) easily changed and easily accomodating assembly and disassembly for repair, adjustment or replacement. In FIG. 7 an optional tubular support element 39 for one of the support elements 37 is shown. It is sized and shaped identically as the external and internal dimensions of the units 37 including out-of-round (hexagonal) peripheral extension 40 for mating and nesting in the recess 16 but the external tubular portion 42 is externally threaded to accomodate drive mechanism as sprockets, gearing and the like so as to make the axle assembly amenable to use with a rear wheel 11, 11a.

Figure 8:
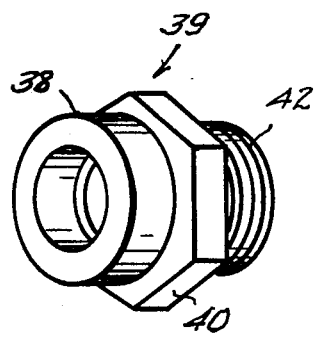

In FIG. 8 the hub 13, integrally formed by injection molding with spokes 14 and rim portions 12, supports the bearing support assembly of axle 32, support elements 37 bearings 34 and mounting nuts 25 all shown in operative assembled relation. In the FIG. 8 the fairing from the hub 13 to the spokes 14 is clearly understood and the shouldering of bearings 34 and support elements 37 in the hub 13 is made clear. The nuts 25 will be understood to also engage the wheel mount fixtures as for example the fork elements of a bicycle wheel running to front or back wheel.

Figure 9:
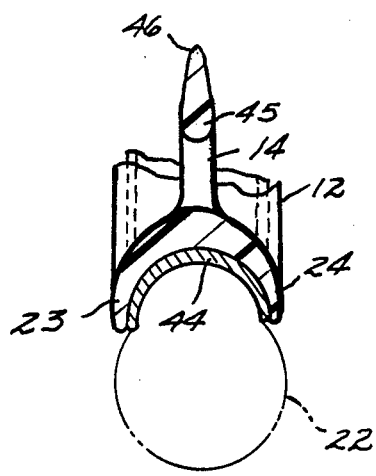
FIG. 9 is a partial cross section view of a rim portion of the wheel and including a metal liner injection molded in-situ in the injection molded wheel rim and indicating the circumferential nesting of the tire against the metal liner.

FIG. 9 is a fragmental portion of the rim 12 injection molded to a circumferential rim liner of metal 44 located in the concave portion of the rim 12 between flanges 23 and 24 and cast in situ by the resin/filler injection molding composition. This liner 44 is useable where extra strengths are required in special stress cycling situations. The spoke 14 viewed as a vane or air foil in its cross section presents the larger size of the tear-drop configuration as the preferred leading edge 45 and the narrower portion 46 of the foil or spoke 14 is the trailing edge. As will be appreciated all spokes 14 are mounted in the same facing direction so that all of the leading edges engage the ambient air in the same manner achieving the maximum stability and with minimum resistance and turbulence under dynamic conditions.

In operation bicycles equipped with the wheels 11, 11a of the present invention experienced excellent performance and stability. The gyroscopic aspects of the bicycle wheel are favorably demonstrated and the wheels demonstrate excellent balance from the molds. They are tough and durable under variant terrain conditions and are easily field-stripped for repair and replacement of tires and wheels. As contrasted with loose balls found in many bicycle situations the sealed bearings or cartridge bearings are simply removed and replaced very speedily and efficiently. The strength and ruggedness is markedly improved over the light weight racing wheels which the wheels of the present invention replace. Shock loading seems to be easily handled and no history has yet been established showing any basic drawbacks. The aerodynamics from the reduction of turbulence is heralded as very much improved.

Having thus described my invention and the preferred embodiment thereof those ordinarily skilled in the art will perceive changes, improvements and modifications within the skill of the art and such changes, improvements and modifications are intended to be included limited only by the scope of the hereinafter appended claims.

I claim:

1. An injection molded wheel of the bicycle type comprising:
   a rim portion;
   a metal rim liner perimetrically secured to said rim portion;
   a hub portion integral with said rim portion and said rim and hub portions radially connected by vane-like spokes each of said spokes having a tear drop cross sectional configuration and said rim portion, said hub portion, and said vane-like spokes being integral in a cured polyamide with uniformly dispersed fiber filler;
   a pair of bearing supports press fitted into said hub portion on the axis thereof, one at one side of said hub portion and the other at the opposite side of said hub portion and said bearing supports fixed against turning on said axis; a pair of cartridge type sealed anti-friction bearings, one peripherally secured in each of said supports;
   a tubular axle having cylindrical journal extensions partially in support of said bearings and having threaded end portions; and
   a pair of threaded nuts over said threaded end portions of said axle and said nuts including a cylindrical projection in partial inner support of said bearing served by said nuts and in axial register with said cylindrical journal extension on said tubular axle.

2. In the combination of claim 1 wherein said fiber filler comprises fiber glass.

3. In the combination of claim 1 wherein said fiber filler comprises graphite fiber.

4. An injection molded wheel of the bicycle type comprising:
   a rim portion;
   a metal rim liner perimetrically secured to said rim portion;
   a hub portion integral with said rim portion and said rim and hub portions radially connected by vane-like spokes, each of said spokes having a tear drop cross sectional configuration and said rim portion, said hub portion, and said vane-like spokes being integral in a cured polyamide with uniformly dispersed fiber filler;
   bearing support means press fitted into said hub portion on the axis thereof and secured in said hub portion fixed against axial rotation independent of said hub;
   threaded means securing said bearing support means in said hub portion against axial displacement;
   a pair of cartridge type sealed anti-friction bearings, one at each end of said support means;
   retainer means for said anti-friction bearings;
   a tubular axle having threaded end portions supported by said bearings; and
   a pair of nuts in partial end support of said bearings and in axial register with said cylindrical journal extension of said tubular axle.

* * * * *